United States Patent Office 2,877,198
Patented Mar. 10, 1959

2,877,198

MOLDING COMPOSITION COMPRISING FUSED ALUMINUM SILICATE IN FIBER AND PELLET FORM AND PROCESS OF MAKING SAME

Richard T. Morrissey, Cuyahoga Falls, Ohio, assignor to The B. F. Goodrich Company, New York, N. Y., a corporation of New York No Drawing. Application July 30, 1956
Serial No. 600,716

7 Claims. (Cl. 260—29.3)

This invention relates to molding compositions having useful coefficients of friction at high temperatures and other excellent high temperature properties, which compositions are particularly valuable as brake lining materials under high energy conditions, and methods for making such molded compositions.

It is an object of this invention to provide molding compositions useful as improved friction materials which have high coefficients of friction at high temperatures, which are not decomposed and which do not flow or swell under conditions of high pressure and temperature, and which, when used as a brake lining material under high energy conditions, do not "fade" or "freeze." Other objects will be apparent from the description which follows.

The objects of this invention are accomplished through the use of novel compositions of matter comprising a major proportion of an aluminum silicate inorganic material containing fused alumina and silica, a thermosetting resin, water glass, and copper and lead. These novel compositions may be readily molded. Quite unexpectedly, these compositions have low thermal conductivity and low coefficient of expansion at high temperatures and do not swell or flow even under pressure at temperatures as high as about 2000° F. These novel compositions also have high coefficients of friction at high temperatures.

One of the most useful applications of the compositions of this invention are as brake lining materials for use in brakes for high speed, high pay load airplanes, particularly of the jet types. In such applications these molding compositions in the form of lining materials display unusually good properties under high energy conditions, that is, at the high temperature and pressure conditions under which the linings must function which are a result of the speed and load of such carriers. Under such conditions the dynamic coefficient of friction of the compositions for braking purposes is more than adequate and increases with increases in temperature and pressure. There is a minimum of fading at high temperatures and pressures which is not the usual condition with the more conventional asbestos type brake linings in such applications in which the coefficient of friction falls off markedly at higher temperatures. Most sintered metal linings have a tendency to melt and flow and fuse or weld to other brake mechanism surfaces under the extreme operating conditions of high speed air carriers. Ceramic linings tend to swell at high temperatures and interfere with proper operation of the braking mechanisms. These problems are not present when the compositions of the present invention are used in brake linings in braking mechanisms including the drum and disc type brakes. The molding compositions of this invention are also useful in other applications requiring heat resistance, high coefficient of friction, low coefficient of expansion and low thermal conductivity.

A representative composition of this invention is as follows: 100 weight parts of an inorganic composition containing a major proportion of substantially (by oxide analysis) about equal parts of silica and alumina, about 7.5% titania, and minor amounts of iron oxide and alkali oxides, said composition containing a mixture of both fibers and small pellets of the same composition; 30 weight parts of a thermosetting molding resin such as phenol formaldehyde; 40 weight parts of a 30% solution of water glass; 0.4 weight part of sodium silica fluoride, 10 weight parts of water, 15 weight parts of copper, 1.5 weight parts of iron, 1.5 weight parts of lead and 1.5 weight parts of tin. When this material is molded under heat and pressure the resulting product is found to have an average coefficient of friction in a laboratory tester of 0.317 and good wear rate; an equivalent high temperature brake lining material of asbestos and phenol formaldehyde has a coefficient of friction of only 0.186 in the same test. The above coefficients of frictions are determined by tests in an actual brake drum apparatus and are derived in relation to the torque developed. The coefficient of friction of the compositions of this invention remain relatively constant or increase at high temperatures in the range of about 1100° F. to 2000° F., and these compositions are quite stable at high temperatures and do not swell or flow, or weld to the other braking mechanism surfaces at these high temperatures even under excessive loads.

The constituents of the novel molding and friction compositions of this invention and the amounts of each constituent employed are quite critical and are now set forth in detail.

The inorganic material is a fused aluminum silicate which ordinarily consists of 30% to 70% by weight of silicon oxide, 5% to 50% by weight of aluminum oxide and 2.5% to 50% by weight of titanium oxide by oxide analysis, and more preferably 40 to 60% $SiO_2$, 10 to 45% $Al_2O_3$ and 10 to 40% $TiO_2$. The compositions should contain less than 10% by weight of the alkali oxides and may contain about 1% boron oxide. The preparation and composition of these inorganic materials are set forth in more detail in U. S. Patent 2,710,261 and are described therein as inorganic fibrous materials. These fibrous materials are as long as about three inches, have an average diameter of about 4 microns and may vary from about 1 to about 10 microns in diameter. It is stated in this patent that some of the inorganic material in the form of pellets is obtained in the normal processes required to form the fibrous material. Although these pellets were undesirable in the process of the patent it has been found that they are quite critical and necessary in the compositions of this invention employed in brake linings. When compositions are prepared from the inorganic fiber alone, with no pelletized material present, the coefficient of friction of the composition is lower and wear rate not as satisfactory as when the pellets are present. A useful ratio of fibers to pellets is from about 15 to about 50 weight parts of pellets and from about 85 to 50 weight parts of fiber, preferably a ratio of about 25 to 50 weight parts of pellets to about 75 to 50 weight parts of fiber. One obtains a friction composition having optimum torque properties at these concentrations of pellets. When more than about 50 weight parts of pellets are employed, no improvement in torque is obtained and the life of the compositions is lessened in that it is often more brittle and likely to crack and chip. When less than about 15 weight parts of pellets are employed, the wear-life of such compositions in the form of a brake lining is not increased and the coefficient of friction is decreased. The size of the pellets may be varied from about 20 to about 300 mesh, or range in size from about 1 to about .01 millimeter in diameter. It is preferred that they be relatively uniform and in the range of about 0.9 to 0.03 millimeter in diameter although useful compositions may be obtained from mixtures of pellets ranging in size from about 20 to 220 mesh. As ordinarily received, in the commercial form, one obtains a mass of matted fibers containing pellets which generally collect at the bottom of containers. In a preferred procedure the fibers are chopped or disintegrated to an average length of about one centimeter, and the pellets are added separately to the compositions. If the fiber lengths are excessively long it is difficult to obtain good mixing with the other ingredients of the composition. The length of course, may be varied so long as good mixing is obtained. The molding compositions of this invention are based on 100 weight parts of this inorganic aluminum silicate material.

The thermosetting resin may be any of those well known to those skilled in the art. Useful resins of this nature include the formaldehyde type, such as, resorcinol and phenol formaldehyde, urea and formaldehyde, melamine and formaldehyde, cashew nut oil and formaldehyde and the like. An amount from about 5 to about 50 weight parts of a thermosetting resin are used. More preferably, from about 20 to about 30 weight parts of a phenol formaldehyde molding or laminating grade resin in the powder form are employed. Amounts from about 5 to 50 weight parts of formaldehyde-based resins are effective but amounts from 15 to 35 are more useful. It has been found in some cases that amounts of the thermosetting resin, as high as 40 to 50 weight parts, cause some increase in wear of brake lining composition and amounts from about 5 to 15 weight parts result in slightly lower torque. About 20 weight parts of a phenol formaldehyde molding resin in a dry powder form is a useful amount. Such resins ordinarily are fast curing and contain a catalyst such as hexamethylene tetraamine.

Water glass (sodium silicate solution) is essential in these compositions for high temperature applications. The water glass is ordinarily used in the form of a 30% solution (40° Baumé) and 20 to 30 weight parts of this solution represents the minimum amount that should be used. Amounts as high as about 80 or even 100 weight parts may be employed but a more preferred range is between about 30 and about 60 weight parts. The water sensitivity of the compositions may be adversely affected if too much of this ingredient is added.

The remaining ingredients of the composition are copper and lead powders. These powders should be fine enough to give uniform distribution throughout the mass of the compositions, and materials of a screen size from about 100 to 200 are satisfactory. Copper powder in amounts of about 5 to about 25 and as high as 40 weight parts may be employed, more preferably about 10 to 20 weight parts. About 15 weight parts is a useful concentration. The copper may contain a small amount of tin from, about 5% to about 25%. Brass may be used in place of part or all of the copper. The amount of lead employed is critical but may be varied from about 1 to about 8 weight parts. When more than about 5 to 7 parts of lead are employed, the torque of the product in high energy brake applications decreases. When less than about 2 weight parts are employed the wear of the compositions increase. The optimum amount of lead is about 2 to about 4 weight parts for many brake applications.

Other ingredients may also be used in these compositions. For example, a small amount of sodium silica fluoride, less than about 1 part may be advantageously used. Small amounts of other powdered metals may likewise be incorporated into the compositions as desired. For example, iron powder may be employed in amounts from about 1 to about 5 weight parts. The amount normally employed is about 1.5 weight parts. Antimony trioxide in amounts from about 0.1 to 3 parts may be added to decrease wear rate. Tin is a particularly valuable additive in amounts from about 1 to about 5 weight parts. For ease in molding, about 10 to 20 parts of water are added to the mixture. If more than about 20 parts of water are employed, the thermosetting resin may flow out of the product during the molding process.

The procedure normally used in mixing the various ingredients is as follows: the defined inorganic aluminum silicate fibrous material and powdered phenol formaldehyde resin are mixed together. As an alternative procedure the inorganic fibers are mixed with the water glass and allowed to age prior to adding the other ingredients. The metal powders including copper and lead are then dropped or blown into the mixture, then the small aluminum silicate pellets of the inorganic material are added. Of course these pellets may be added mixed with the fiber form of this material so long as they do not settle out during the mixing and/or are uniformly distributed therein. The sodium silica fluoride dissolved in water is mixed with the water glass solution and this mixture is sprayed or dropped into the mixer wherein the other ingredients are being agitated. Any procedure leading to an intimate mixture of the ingredients may be employed. The mixture is then molded under pressure at a temperature of about 350 to 400° F. for 30 minutes to one hour to obtain a unitary, strong and tough rigid article. Other temperatures and times depending on the nature of the thermosetting resins may be employed. It is important that any gas and the water in the compositions be removed during the early stages of the molding. This is quite easily accomplished by bumping the molding press several times during heating. The compositions of this invention must be of at least a certain minimum hardness. The hardness value is determined with a Rockwell tester using a 60 kilogram weight, and on the C scale should be greater than about 35. The best performances under high energy conditions are obtained with compositions having hardness values between about 65 and 85. Compositions having hardness values greater than about 100 have been successfully employed. Compositions within these hardness values are obtained when the critical ratios of ingredients set forth herein are employed.

A typical molding composition of the invention, mixed as described above is prepared from 75 weight parts of the aluminum silicate material (containing a major proportion of about equal quantities of alumina and silica prepared as described in U. S. Patent 2,710,261) in the form of chopped fibers which average about one centimeter long, 25 weight parts of aluminum silicate pellets of the same composition having an average particle size of about 0.5 millimeter, 20 weight parts of a finely divided phenol formaldehyde molding resin, 40 weight parts of a 30% solution of water glass, 10 weight parts of water containing 0.4 weight part of sodium silica fluoride, 17 weight parts of copper powder (the copper employed contains about 10% tin), 1.5 weight parts of iron powder and 3 weight parts of powdered lead. Molded test pieces of this mixture have a coefficient of friction of 0.344, a wear value of 0.0018 inch per application, thermal conductivity of 0.0012 cal./cm.²/cm./sec./° C. and zero coefficient of expansion from about 70° F. to greater than 300° F.

When this molding composition contains 60 weight parts of water glass, the coefficient of friction is 0.377 and the wear value is 0.0016 inch. When the iron powder is left out of the compositions, a material having a coefficient of friction of 0.361 and a wear value of 0.0020 is obtained. When compositions are prepared using 50 weight parts of the aluminum silicate pellets of about 0.9 mm. size and 50 weight parts of the fiber in the first listed composition, a coefficient of friction of 0.335 and a wear value of 0.0008 is obtained. When these compositions are prepared with 25 weight parts of pellets of average diameter about one millimeter in size, the molded composition has a 35 percent greater coefficient of friction and a lower wear value than those of pellets of smaller size. In all of these varied compositions the torque values are essentially the same. When the basic recipe above is repeated without water glass, the molded composition has a coefficient of friction of only 0.259, a poor wear value of 0.0038 inch and a lower torque value. The wear value is determined on a comparative basis in a high energy brake test apparatus and represents average actual decrease in thickness of the test pieces after 10 and 20 test stops.

As a consequence of the novel combination of properties of the composition of this invention these materials find use not only as a friction material for use in braking mechanisms but in other applications where heat resistance, low heat conductivity, low coefficient of expansion, wear resistance and the like are required as in insulators, bushings, gaskets, clutch facings and like applications. These and other articles are readily prepared by forming or molding the composition defined above.

Although representative embodiments of the invention have been specifically described, it is not intended that the invention be solely limited thereto since it will be apparent to those skilled in the art that modifications and variations may be made without departing from the spirit and scope of the invention as defined in the appended claims.

I claim:

1. A composition comprising 100 weight parts of a fused aluminum silicate in both fiber and pellet form with a major proportion by weight of fiber, about 5 to about 50 weight parts of a solid thermosetting resin selected from the class consisting of phenol formaldehyde resins, resorcinol formaldehyde resins, urea formaldehyde resins, melamine formaldehyde resins, and cashew nut oil formaldehyde resins, about 20 to about 100 weight parts of water glass, about 5 to about 40 weight parts of copper, and about 1 to about 8 weight parts of lead.

2. A composition comprising 100 weight parts of a fused aluminum silicate material containing by analysis about 30 to 70% silicon oxide and about 5 to 50% aluminum oxide, said aluminum silicate being in both fiber and pellet form with a major proportion by weight of fiber, about 5 to about 50 weight parts of a solid thermosetting resin selected from the class consisting of phenol formaldehyde resins, resorcinol formaldehyde resins, urea formaldehyde resins, melamine formaldehyde resins, and cashew nut oil formaldehyde resins, about 20 to about 80 weight parts of water glass, about 5 to about 25 weight parts of copper, and about 1 to about 5 weight parts of lead.

3. A molding composition comprising 100 weight parts of fused alumina silica material comprising by oxide analysis about 40 to 60% silica, about 10 to 45% alumina, about 10 to 40% titania, said alumina silica titania material comprising a mixture of about 15 to 50 weight parts of small pellets and about 85 to 50 weight parts of fiber, about 10 to about 50 weight parts of a formaldehyde solid thermosetting resin selected from the class consisting of phenol formaldehyde resins, resorcinol formaldehyde resins, urea formaldehyde resins, melamine formaldehyde resins and cashew nut oil formaldehyde resins, about 30 to 80 weight parts of 40° Baumé water glass, about 10 to 20 weight parts of copper and about 1 to 5 weight parts of lead.

4. A molding composition having a high coefficient friction and a low coefficient of expansion comprising a mixture of 100 weight parts of fused alumina silica titania material comprising by oxide analysis about 47% $SiO_2$, 43% $Al_2O_3$, 7.5% $TiO_2$, said alumina silica titania material comprising a mixture of about 15 to about 50 weight parts of pellets having a diameter from about one to about one-hundredth millimeter and from about 85 to about 50 weight parts in the form of fibers, about 15 to about 35 weight parts of phenol formaldehyde thermosetting resin, about 30 to about 60 weight parts of a 30% water solution of sodium silicate, about 10 to 20 weight parts of copper powder and about 2 to about 4 weight parts of lead powder.

5. A molding composition especially adapted for use in brake linings and having a high coefficient of friction at high temperatures comprising 100 weight parts of fused alumina silica titania material consisting essentially of, by oxide analysis, about 47% $SiO_2$, 43% $Al_2O_3$ and 7.5% $TiO_2$, said alumina silica titania material being present to the extent of about 25 to 50 weight parts of pellets having a diameter from about 0.9 to 0.03 millimeter and from about 75 to about 50 weight parts of fibers having an average length of about one centimeter, about 20 to about 30 weight parts of a thermosetting phenol formaldehyde molding resin, about 40 weight parts of a 30% water solution of sodium silicate, about 0.4 weight part of sodium silica fluoride, about 10 weight parts of water, about 15 weight parts of copper powder, about 1.5 weight parts of tin, about 1.5 weight parts of iron powder and about 3 weight parts of lead powder.

6. A molding composition especially adapted for use in brake linings and having a high coefficient of friction at high temperatures comprising 100 weight parts of a fused aluminum silicate material containing a major proportion in about equal amounts of alumina and silica, said aluminum silicate material being present to the extent of about 25 to 50 weight parts of pellets having an average diameter from about 0.9 to about 0.03 millimeter and from about 75 to about 50 weight parts of fibers having an average length of about one centimeter, about 20 to 30 weight parts of a thermosetting phenol formaldehyde molding resin, about 40 weight parts of a 30% water solution of sodium silicate, about 0.4 weight part of sodium silica fluoride, about 10 weight parts of water, about 15 weight parts of copper powder, about 1.5 weight parts of iron powder, about 2 to 4 weight parts of lead powder and about 1 to 5 weight parts of tin.

7. The process for preparing a molded composition which comprises mixing together 100 weight parts of a fused aluminum silicate material in both fiber and pellet form with a major proportion by weight of fiber, about 5 to about 50 weight parts of a solid thermosetting resin selected from the class consisting of phenol formaldehyde resins, resorcinol formaldehyde resins, urea formaldehyde resins, melamine formaldehyde resins, and cashew nut oil formaldehyde resins, about 20 to about 100 weight parts of water glass, about 5 to 40 weight parts of copper, and about 1 to about 8 weight parts of lead, and thereafter heating the resulting mixture under pressure to produce a solid, unitary, cohesive mass.

References Cited in the file of this patent

UNITED STATES PATENTS

| | | |
|---|---|---|
| 2,472,247 | Coleman | June 7, 1949 |
| 2,534,607 | Laher et al. | Dec. 19, 1950 |
| 2,569,539 | Schultz | Oct. 2, 1951 |
| 2,662,022 | Dietz | Dec. 8, 1953 |